(12) United States Patent
Billups, III (10) Patent No.: US 6,173,246 B1
(45) Date of Patent: Jan. 9, 2001

(54) METHOD AND SYSTEM FOR A UNIFIED PROCESS AUTOMATION SOFTWARE SYSTEM

(76) Inventor: James T. Billups, III, 206 N. Kings Canyon, Cedar Park, TX (US) 78613

( * ) Notice: Under 35 U.S.C. 154(b), the term of this patent shall be extended for 0 days.

(21) Appl. No.: 09/121,064

(22) Filed: Jul. 21, 1998

(51) Int. Cl.[7] .............................. G06F 9/45; G06F 17/50
(52) U.S. Cl. .................................. 703/22; 703/6
(58) Field of Search ................................... 345/329, 339; 707/115, 1, 10, 2, 3, 7, 8, 9, 100, 101, 102, 103, 104, 200, 201, 202, 203, 204; 395/500.02; 700/96, 99; 703/6, 7, 22

(56) References Cited

U.S. PATENT DOCUMENTS

| | | | |
|---|---|---|---|
| 5,430,836 | * 7/1995 | Wolf et al. | 395/155 |
| 5,551,030 | 8/1996 | Linden et al. | 395/700 |
| 5,551,037 | 8/1996 | Fowler et al. | 395/600 |
| 5,576,965 | 11/1996 | Akasaka et al. | 364/468.03 |
| 5,600,789 | 2/1997 | Parker et al. | 395/183.14 |
| 5,673,198 | 9/1997 | Lawman et al. | 364/489 |
| 5,950,201 | * 9/1999 | Van Huben et al. | 707/10 |

* cited by examiner

Primary Examiner—Kevin J. Teska
Assistant Examiner—Lonnie A. Knox
(74) Attorney, Agent, or Firm—Taylor Russell & Russell, P.C.

(57) ABSTRACT

A computer implemented system and method for automating design and manufacturing processes that use software application programs having graphical user interfaces. An automation software program, programmed with a design and manufacturing process command flow initiates and monitors the execution of a plurality of design and manufacturing software application programs through the graphical user interface of each software application. The software applications may execute in a preprogrammed sequence on a plurality of computer processors. The graphical user interface provides a visual representation to the user of the design and manufacturing process and its status. In an alternative embodiment, the system and method is used to automate the design and manufacture of electronic circuits.

29 Claims, 9 Drawing Sheets

METHOD AND SYSTEM FOR A UNIFIED PROCESS AUTOMATION SOFTWARE SYSTEM

BACKGROUND

The invention relates generally to software automation tools for controlling design and manufacturing processes. More particularly, the invention is a software method and system that automates the design and manufacturing process by driving multiple software application products though each application's graphical user interface. The system automates the design decision process and controls multiple software application products, running either sequentially or simultaneously and executing locally or remotely. The method and system can be used to automate any software application represented in a graphical user interface. In its present embodiment, the system and method automates design and manufacturing processes that use software application programs having a graphical user interface. In an alternative embodiment, the system and method automates the design and manufacture of electronic circuits.

Designing and manufacturing electronic circuits is a complex process. Because it is complex, the process is time consuming and costly. Rapid advances in materials and manufacturing technology require constant changes in design and manufacturing techniques. It is desirable to speed up the process to bring advanced technology products to market faster, while minimizing cost. Part of speeding up the process involves automation. While there currently exist a number of software application programs that automate individual parts of the design process, the overall design process is not automated and still requires constant manual intervention by the circuit designer. In addition, there is no automated way of building a model that represents the design process and also provides a means of executing the model to build the actual design. Being able to build a model that captures the overall resulting design can help speed up the process because it can be reused by other designers and used to educate others in the design process.

Automating design and manufacturing processes, in particular, automating the design electronic circuits is also an iterative process. First, the requirements are developed and input to one or more software design tools to create a functional description of the electronic circuit to be created. Next, the output of this step is input to tools that "implement" the circuit, that is, produce the circuit configuration of the functional description of the circuit. The functional description of the design is first synthesized to its logical elements and then to its physical implementation. The output from each phase for each part of the design can be used to run simulations to test the adequacy of the logical and physical aspects of the design with regard to function, speed, timing, size, or other criteria that are important to the operation of the circuit. Information from each phase of this process can also necessitate changes or corrections to previous steps in the process that may impact one or more subsections of the design. This process involves many individual designers and individual design tools to complete one pass of the product.

Design flow development and automation is an important way to speed up and improve the design process. Many types of software programs currently exist to automate aspects of the design process as much as possible. Most of these programs operate independently, on different computer platforms and have different operator interfaces. The data output from one tool often needs to be input to another tool and the input data needs to be precisely formulated and formatted before the parameters are passed from one tool to another. This process of capturing the data output from one tool and formatting it for use by another tool can be done by the designer either manually or by writing batch scripts that capture the data output from one software tool, convert the data to the correct format and input the converted data to another software tool. This process has to be repeated for each software tool used in the design and manufacture process. Even using batch scripts, these tools still remain stand-alone applications that execute independently and are not part of a formalized, centralized design process. Because of this, even though the existing tools may be individually automated, the overall design process model, along with the individual designer's knowledge and experience, is not automated. The process is further complicated because often many designers work together on one design, all of whom may gain their own knowledge and experience, but have to relearn other parts of the process.

Using conventional scripting to automate the actions of a software tool requires the user to learn the macro or scripting language, which are often custom or proprietary languages, associated with the tool. Because the composed scripts are textual rather than graphical, it is more difficult to understand their functionality and to make modifications. Therefore, the designer must understand and be knowledgeable not only in the design and manufacturing process, but also in the programming of multiple scripting languages. In the case of designing electronic circuits, for example, the parameters of the electronic circuit must first be defined, the software tools chosen to design the circuit, the batch script written, the input data parameters selected to be input to the tool by the batch script, and finally initialization of the script and software tool. This same process must then be repeated for each software tool used in the design process. In addition, if multiple tools are to be automated in sequence, another overall command script that invokes each software tool and its own batch script must then be constructed.

Automation of the individual software tools and the sequential activation of multiple software tools to create a "design process" is also limited because not all tools have a scripting language. Of those that do, generally only a subset of the functions of the tool may be controlled by the scripting or programmatic method of control. Often, conditional constructs to allow for different responses based on variations in input data are not available. Scripts normally initiate a process, and then operate in the background. As the user has no further control after initiation, scripts are usually run with the graphical mode of the application turned off, and no exchange of knowledge or interaction with the user occurs. Depending upon the compatibility of the software tools used, it may be impossible to use scripts to sequentially run the design process.

SUMMARY

The present invention proposes to solve these problems by providing a software tool that operates the multiple design application tools needed for automating the design and manufacturing process. The method and system of the present invention automates the design process by providing a unified software automation program that initiates and runs the multiple software packages through their graphical user interface. Using the software package's graphical user interface has many advantages in automating the design process. The automation software program provides the interface to the user, which is programmed with the desired design process or steps, and initializes and runs the software packages that are used in the design and manufacture process. Any software package can be controlled independently of other packages while also being part of the overall sequential design process. The automation software program can also control multiple software applications running on multiple platforms. In particular, the automation software program can be used to automate the design and manufacture of electronic circuits.

The automation tool has two functional areas: flow automation and design management. Flow automation contains existing design processes, as represented by a design flow model and also produces new design flow models. Flow automation automates many of the repetitive tasks that previously had to be manually completed by the user. It gives the user an environment that drives all of the software applications needed in the design flow, automates as many functions as possible and tracks incremental progress. The design management function of the process automation software program captures the progress and status of the entire design process. The representation of the entire design process is output to the user in the form of a graphical interactive flow diagram that represents the design flow model. The model, which is an active sequential depiction of the design process, can be reused or modified by the designer and other design teams members to improve the design process or to correspond to advances in design and manufacturing technology.

Communicating with the software applications through their graphical user interface creates a standard interface protocol, unlike using conventional scripting languages. As a result, many software application specific dependencies are eliminated. The process automation software program itself has its own graphical user interface. The design process, as represented by a design flow model, is represented graphically on the user's screen. The process automation software program initiates the software applications and can be completely automated without requiring user intervention once the design flow model is initiated, either by a user or by a background software process. Alternatively, the process automation software program allows the designer to interact with the design process by providing status and allowing the designer to input commands through the program.

The process automation software program can control multiple software applications running on multiple platforms and supports a concurrent hierarchy of active design processes. This allows branches of the design flow that are not dependent upon each other to be executed at the same time. The process automation software program also supports a cross functional mode of interactive operation. For example, if the user wants to display different representations of a single connection in the electronic circuit, the user can select this action and the appropriate command is sent to each software application that is running. Cross functionality can be used in this way to create new solutions by combining the capability of multiple software applications. Linking software applications through their graphical user interfaces to form collaborative functions without requiring modification of the software application can increase the speed and quality of the design and manufacturing process. Because of interface problems using different tools, this has not usually been possible prior to communicating through the graphical user interface of the software application.

The present invention comprises a method for automating a design and manufacturing process, in a computer program running on a computer processor having an automation software program executing on the computer processor, programmed with a design and manufacturing process command flow. The automation software program through the command flow is allowed to initiate and monitor the execution of a plurality of design and manufacturing software application programs, each software application program having a graphical user interface. The initiating and monitoring of the execution of the software application programs is by communicating through the graphical user interface of each software application. The software application programs may be executed on the same computer processor as the automation software program. Alternatively, the software application programs may be executed on a plurality of computer processors. The software application programs may be initiated, executed and monitored in a preprogrammed sequence. A graphical user interface to the automation software program may be provided along with a visual representation of the design and manufacturing process command flow of the automation software program, through the graphical user interface of the automation software program. The user may selectively change the automation software program command flow by inserting user commands, inserting input data, changing the order of the initiation of the software application programs, deleting software application programs, and adding software application programs. Feedback to the user of the status of the operation of the process command flow and the status of each software application while it is being initiated and executing, along with the output data and status after each software application has completed running may be provided to the user. The visual representation of the process command flow may be a flowchart representing the command flow displayed on the graphical user interface. The status and output data may be displayed to the user on the flowchart. In an alternative embodiment, the design and manufacturing process is for the design and manufacture of an electronic circuit. Input and output data may be electronic circuit data.

In a preferred embodiment, a process automation software program may be built comprising a design flow process model, the model is programmed with a series of command steps, the steps including the execution order of the software application programs. The program includes a display interface controller that simulates the graphical user interface of the software application program and sends graphical user interface commands to a display server for the software application program and a process controller which executes the design flow process model, controls the order of the command steps and communicates the command steps to an application controller, tailored for each software application program. The application controller translates the process control commands into graphical user interface commands and sends the commands to the display interface controller for communication to the display server for the software application program. An application monitor monitors the status of the software application program being executed and communicates the status to the application controller and to the process controller. The method may include running the process automation software program by executing the design flow process model through the process controller, which initiates the design flow process, controls the order of the command steps and communicates the command steps to the application controller. The application controller translates the command steps into graphical user interface commands and sends the commands to the display interface controller. The display interface controller sends the graphical user interface commands to a display server for the software application program. The software application program is initiated and executed the by means of the graphical user interface commands. Graphical interface commands from the display server are received at the display interface controller. The application monitor monitors the status of the software application program being executed and communicates the status of the software application program to the application controller and to the process controller. The design flow process model, with its series of command steps, may be represented to the user through the graphical user interface as a flow diagram comprising selectable symbols that represent the software application programs, the command steps, input data, and output data. A new process automation software program may be built by allowing the user to selectively change the flow diagram by deleting, reordering or manipulating the selectable symbols via the automation software program's graphical user interface. The status and progress of the automation software program and the status of the software application programs is displayed to the user via the flow diagram of the flow process model. The status and progress of the automation software program and the status of the software application programs may be shown by means of colors displayed on the flow diagram.

A new process automation software program may be built by allowing the user to selectively change the flow diagram by adding software application programs from a library of stored programs via the automation software program's graphical user interface. A new process automation software program may be built by allowing the user to selectively enter design and manufacture problem parameter data into the process automation software program via the automation software program's graphical user interface. The process automation program may be run after initiation without requiring action by the user. Alternatively, while running the process automation program, the user may stop the design flow process, change the order of the process and enter input data to be used in the design flow process.

In an alternate embodiment, the system for automating the design and manufacturing process of an electronic circuit, comprises a specially programmed computer having a memory means, a processor means and a graphical user interface means. The memory means stores a plurality of design and manufacture software application programs, each having a graphical user interface; design flow process models; design and manufacture input data to be input to the software application programs; and design and manufacture output data to be output from the software application programs. The processor means builds a process automation software program comprising the design flow process model, the model is programmed with a series of command steps, the steps including the execution order of the software application programs; a display interface controller that simulates the graphical user interface of the software application program and sends graphical user interface commands to a display server for the software application program; a process controller which executes the design flow process model, controls the order of the command steps and communicates the command steps to an application controller, tailored for each software application program. The application controller translates the process control commands into graphical user interface commands and sends the commands to the display interface controller for communication to the display server for the software application program. An application monitor monitors the status of the software application program being executed and communicates the status of the software application program to the application controller and to the process controller. The processor means executes the process automation software program by executing the design flow process model, which in turn executes the software application programs by initiating and communicating with the software application program through their graphical user interface. The graphical user interface to the automation software program provides the means for displaying to the user the status and progress of the execution of the automation software program and the status of the software application programs while each program is being initiated, executing and has completed. The design flow process model is represented as a flow diagram displayed on the graphical user interface comprising selectable symbols that represent the software application programs, the command steps, input data, and output data. The user is allowed to selectively change the flow diagram by adding, deleting, reordering and manipulating the selectable symbols via the graphical user interface.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
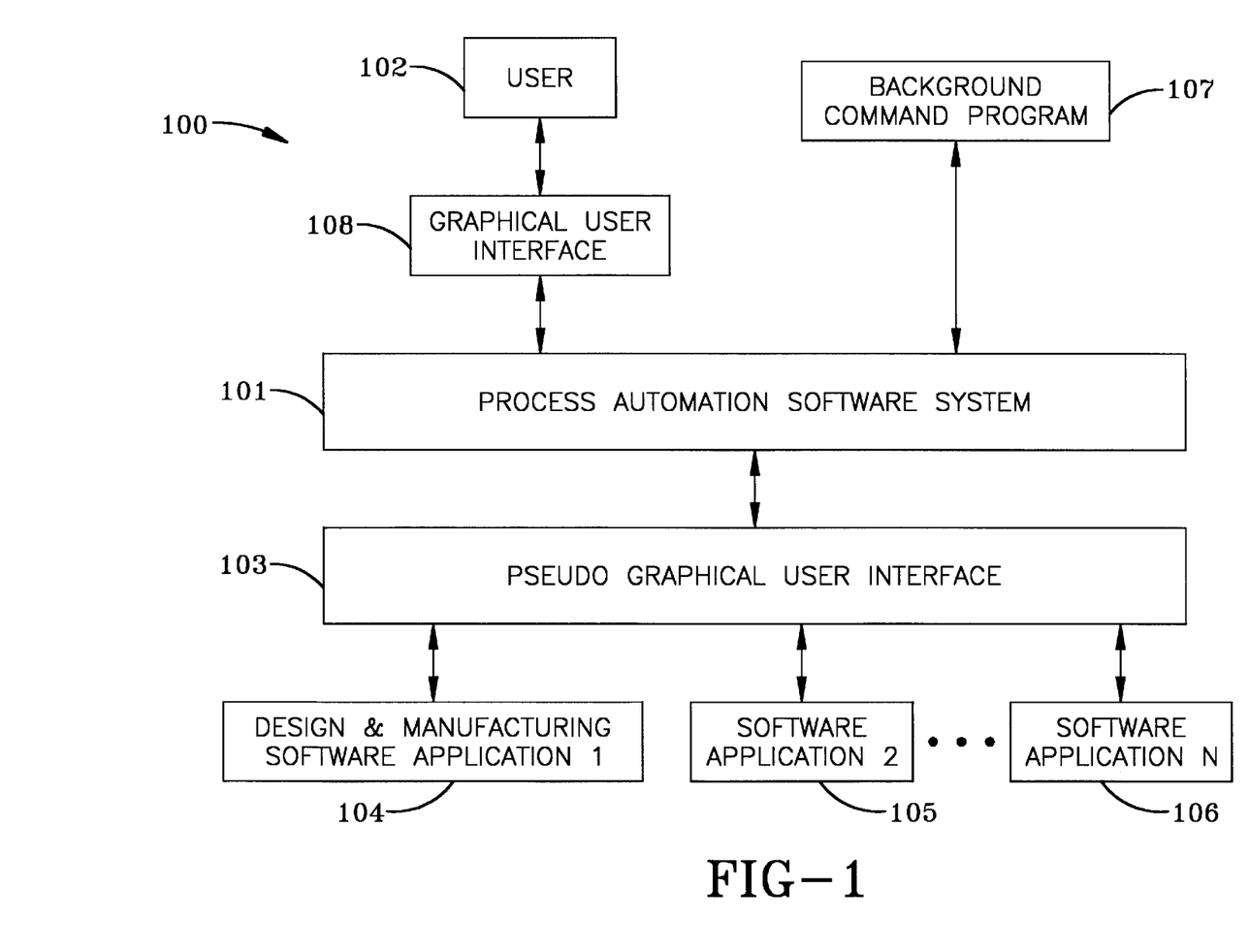
FIG. 1 is a system block diagram of the system for automating the design and manufacturing process in accordance with the present inventive concept.

Turning now to FIG. 1, system block diagram of the system for automating the design and manufacturing process of an electronic circuit 100 is shown. The process automation software system 101 interfaces with a user 102 and is initiated and controlled by the user 102 through a graphical user interface 108. Alternatively, a background command software program can initiate and control the process automation software system 107. The process automation system 101 interfaces to the design and manufacturing software application programs 1 through N 104–106 through a pseudo graphical user interface 103. The pseudo graphical user interface 103 does not have to be displayed to a user, but operates in the background as a pseudo display interface. Communication through the application program's graphical user interface 103 provides a standard interface for communication with the process automation software system 101.

Figure 2:
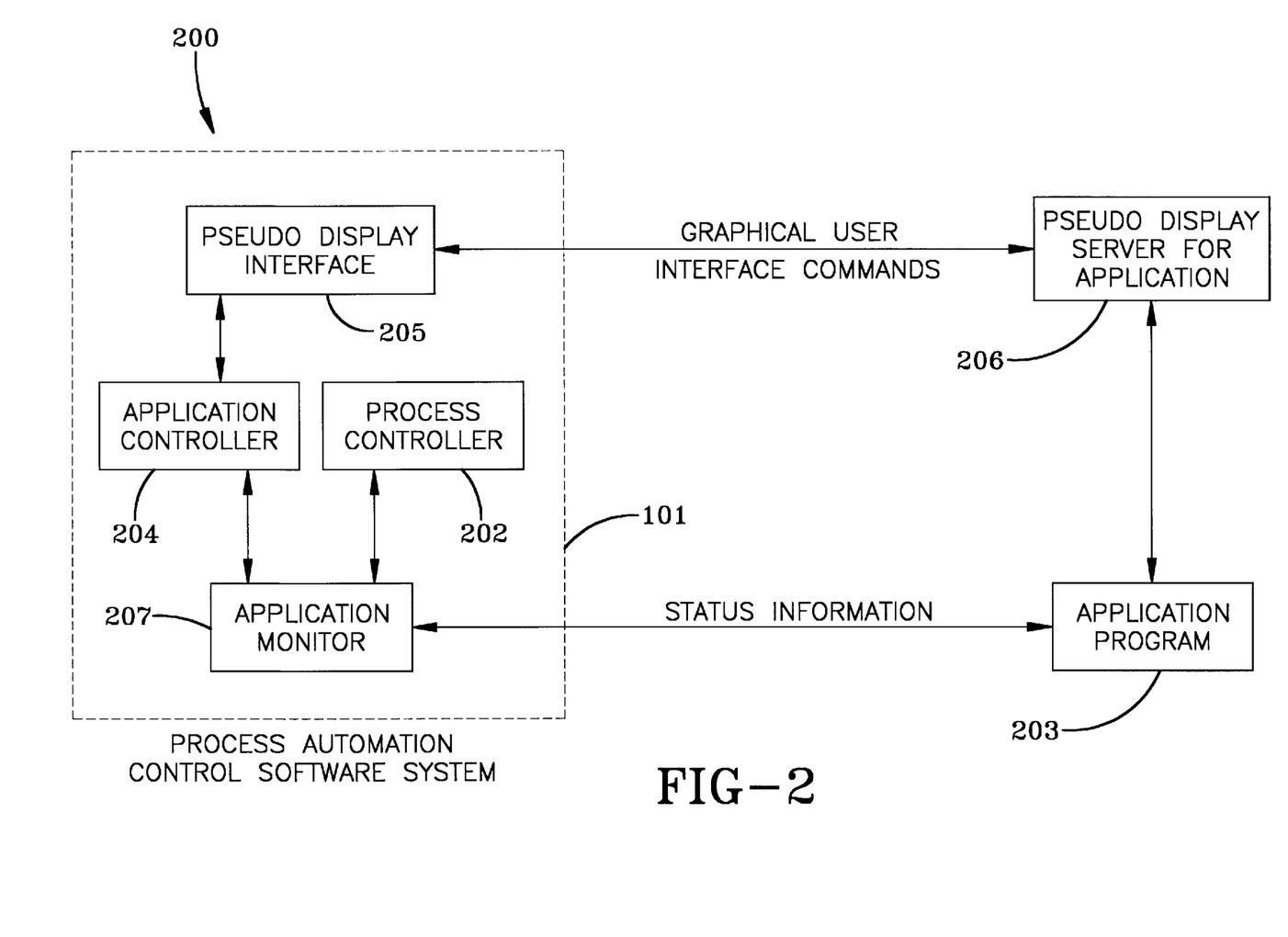
FIG. 2 is a preferred embodiment of process control automation software architecture of the present system for automating the design and manufacturing process in accordance with the present inventive concept.

Turning now to FIG. 2, a preferred embodiment of process control automation software architecture 200 of the present system for automating the design and manufacturing process of an electronic circuit is shown. The process automation software system 101 of FIG. 1 contains a process controller 202. The process controller 202 contains the design and manufacturing process command flow which contains the software program and commands to initiate and control the design process, including the commands to activate the design and manufacturing application program 203. The process controller 202 interfaces and communicates with the application controller 204, which is tailored for each software application program. The application controller 204 stores the user events for each discrete action of the particular application 203, to be used as needed for a given process command flow initiated by the process controller 202. Each application controller 204 contains the characterization of the application, that is all of the application's discrete actions and corresponding events are logged, forming a translation table or map. An example of a discrete action would be functional calls in a programming language, such as opening a file. An example of a corresponding event for the discrete action of opening a file might be the user actions via a graphical user interface to open the file, such as selecting a pull down menu, clicking on it, selecting a file, and selecting open. Using the stored user events for discrete actions as needed, the application controller 204 translates the process control commands from the process controller 202 into graphical user interface commands and sends the commands to the display interface controller 205. The display interface controller 205 in turn sends the graphical user interface commands to a pseudo display server for the application 206. An application monitor 207 monitors the status of the application 203 being executed and communicates the status to the application controller 204 and to the process controller 202. In the architecture of FIG. 4, the application program and its display server and the process automation software system may reside within one computer processor or may alternatively reside in multiple computer processors.

Figure 3:
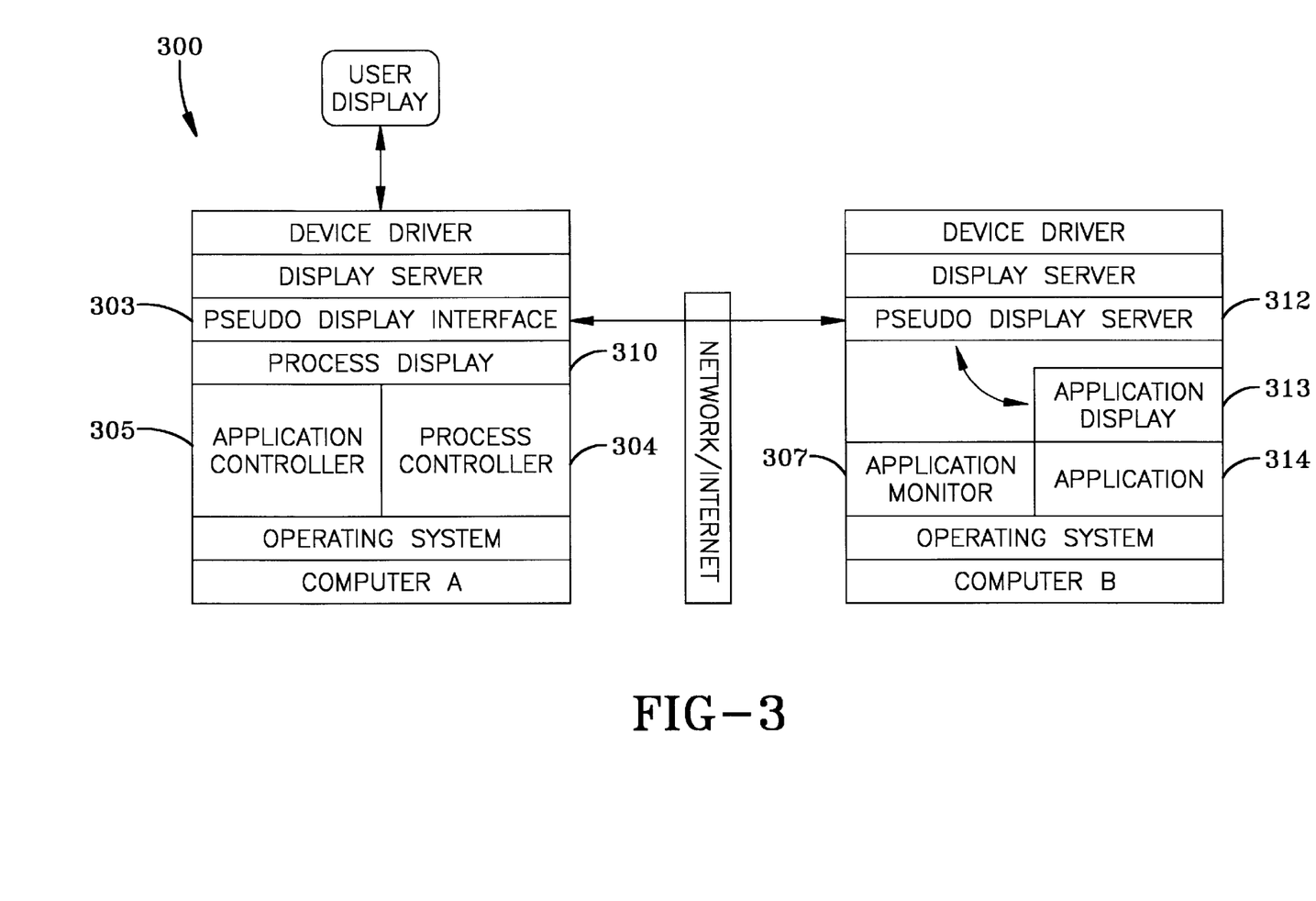
FIG. 3 is another representation of the preferred embodiment of the process control automation software architecture of the present system for automating the design and manufacturing process in accordance with the present inventive concept.

FIG. 3 shows another representation of the preferred embodiment of process control automation software architecture 300 of the present system for automating the design and manufacturing process of an electronic circuit. In FIG. 3, the application program 310 and its display 313 physically reside in a different computer processor, computer B, from the process controller 304, application controller 305, process display 310 and pseudo display interface 303 which reside in computer A. The application monitor 307 may reside in either computer. In computer B, the design and manufacture software application program 314 and the application's display 313 is directed to the pseudo display server 312 running on computer B that preprocesses and sends the display output to the pseudo display client 303 on computer A. When the process automation software program is started, the desired process flow model, in the form of a graphical flow diagram is loaded and displayed. The user clicks on the graphical flow diagram, selecting to execute a function or hierarchy of functions from the flow diagram. This is a section of the process or the complete process to be done. The automation software program begins the sequence of steps in the process. The required applications and monitoring tools are started either locally or on a computer linked through a network or Internet interface. The process diagram indicates specific actions to be taken. The automation tool communicates with the pseudo display interface 303. The events are sent, as if a user were actively entering them, to the application 314. The applications response to the events is studied by the application monitor 307 and to a lesser extent by detecting that a change in the display has occurred when expected. The application monitor 307 communicates specific information regarding the state of the application in use 314 and is output to the process controller 304 to provide the necessary information to effect the next course of action to be taken in the process. The process controller 304 attempts to reconcile problems encountered. If unexpected problems arise during the process, as for example from variances in design conditions, tools, input data, they can be flagged to the user and the design process can continue under the direction of the user. If a solution path was not programmed into the flow model and a solution could not be found by the process controller 304, that branch of the process is paused and the color of the graphical element in the flow model diagram is turned red to notify the user. Other means of user notification may also be used.

Figure 4:
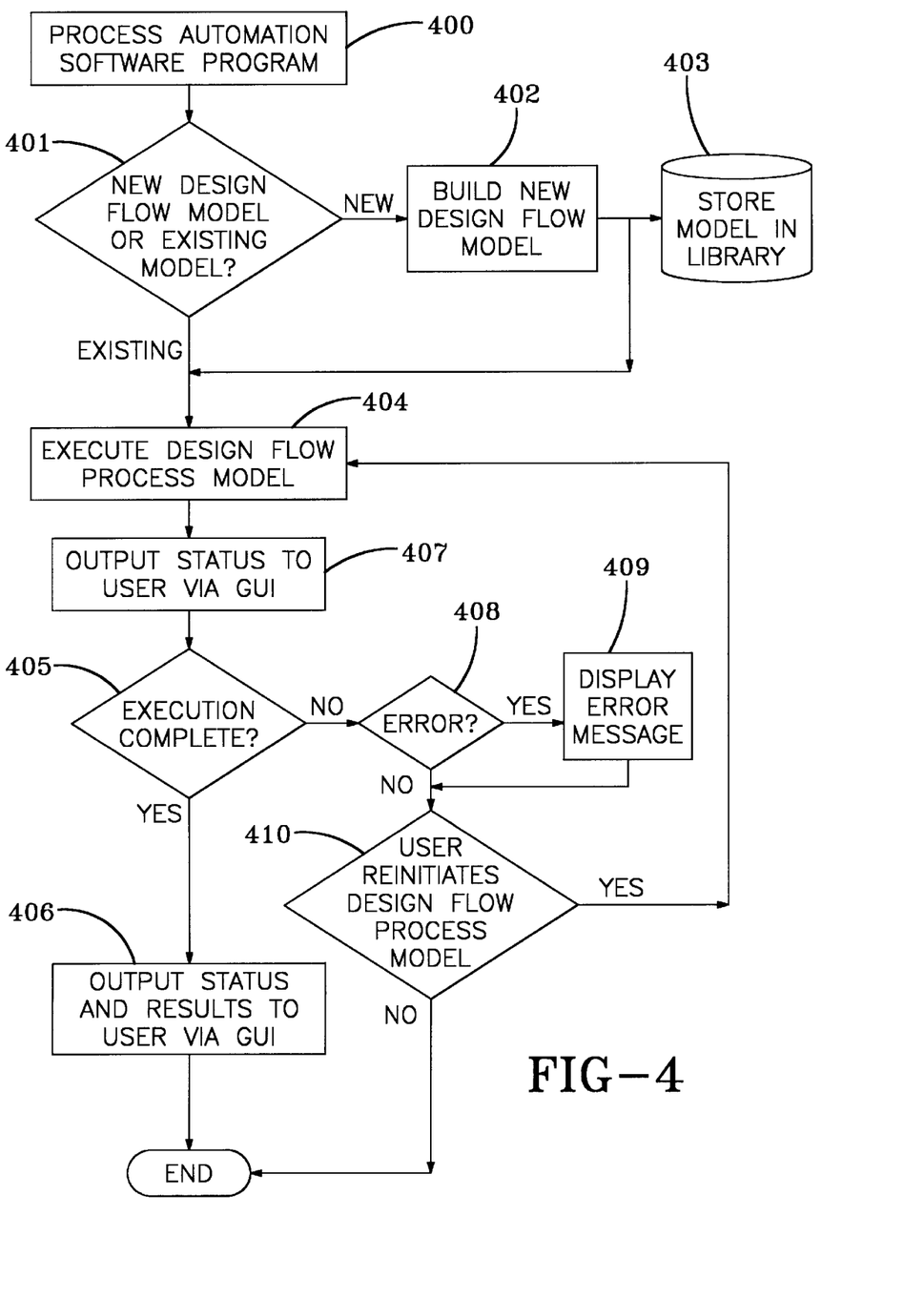
FIG. 4 is a flowchart for the operation of the process automation software program in accordance with the present inventive concept.

FIG. 4 shows a flowchart for the operation of the process automation software program 400. Upon user initiation, the program checks to see if a new design flow model is to be built, or if an existing model will be used 401. If a new model is to be built, the program allows the user to build a design flow process model 402 and stores the model in a model library 403. The design flow process model is then executed 404 using either the design flow process model just built 402 or an existing model. The status of the execution is output to the user via the user's graphical user interface 407. If execution is not complete 405, and an error has occurred 408, an error message is displayed to the user 409. In either case, if the user reinitiates the design flow process model 410, step 404 is repeated and the process continues. If execution of the process model is complete 405, the results are output to the user via the graphical user interface 406.

Figure 5:
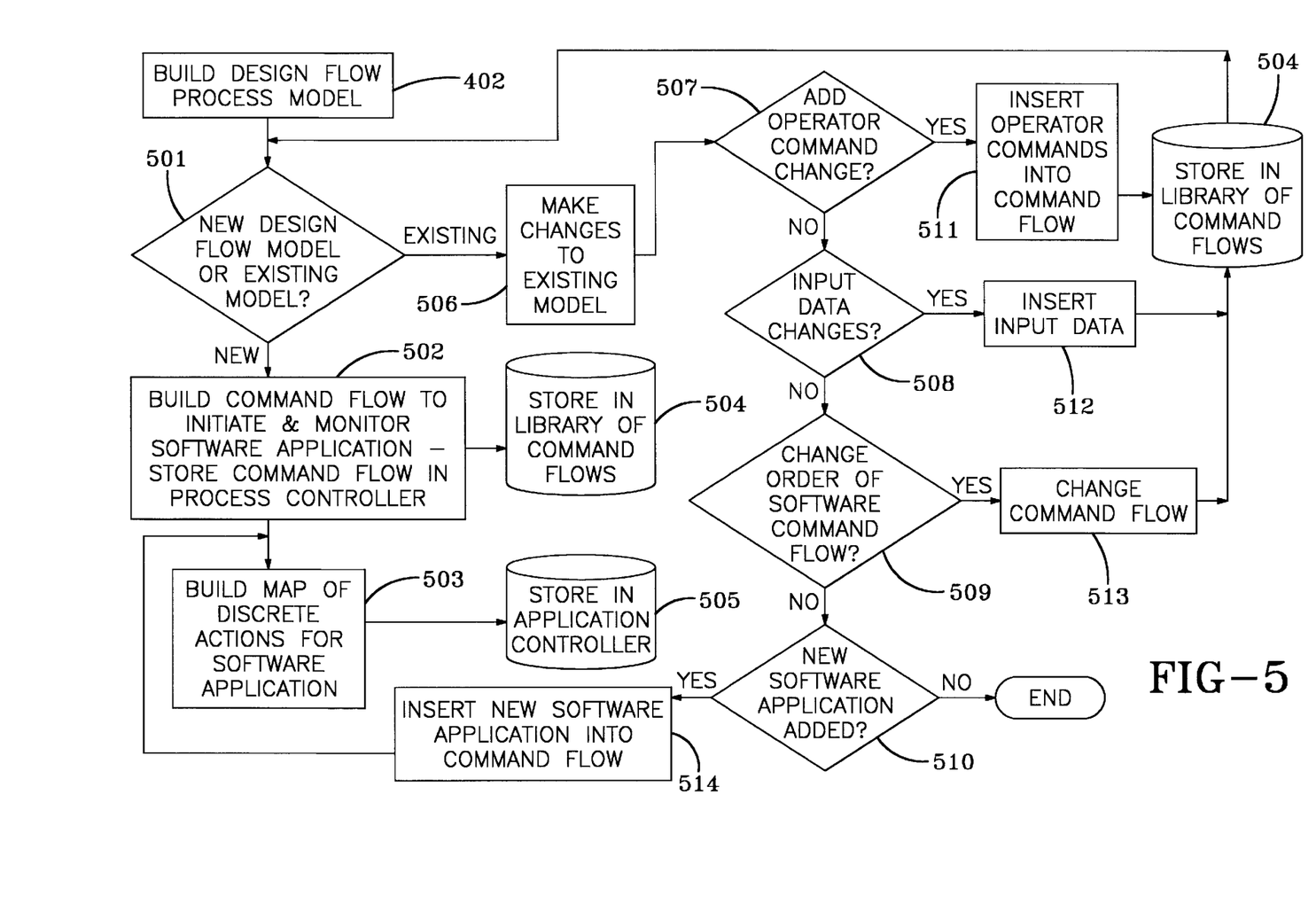
FIG. 5 is a flowchart for building the design flow process model of FIG. 4 in accordance with the present inventive concept.

Turning now to FIG. 5, the Build Design Flow Process Model 402 of FIG. 4 is shown in greater detail. If the model is a new one 501, command flows to initiate and monitor software application programs for designing and manufacturing electronic circuits are built 502 and the commands are stored for execution by the process controller in a library of design flows 504. For new software applications, a map is built of discrete actions for the software application 503 and stored in the application controller 505. If the model is not a new model 501, then changes are made to an existing model 506. If the change is to an operator command 507, input data 508, order of the command execution 509 or adding a new software application 510, the changes are made in the command flow 511–513 and the new command flow is stored in a library of flows 504. If a new software application has been added 510, the new software application is inserted into the command flow 514 and processing continues at step 503.

Figure 6:
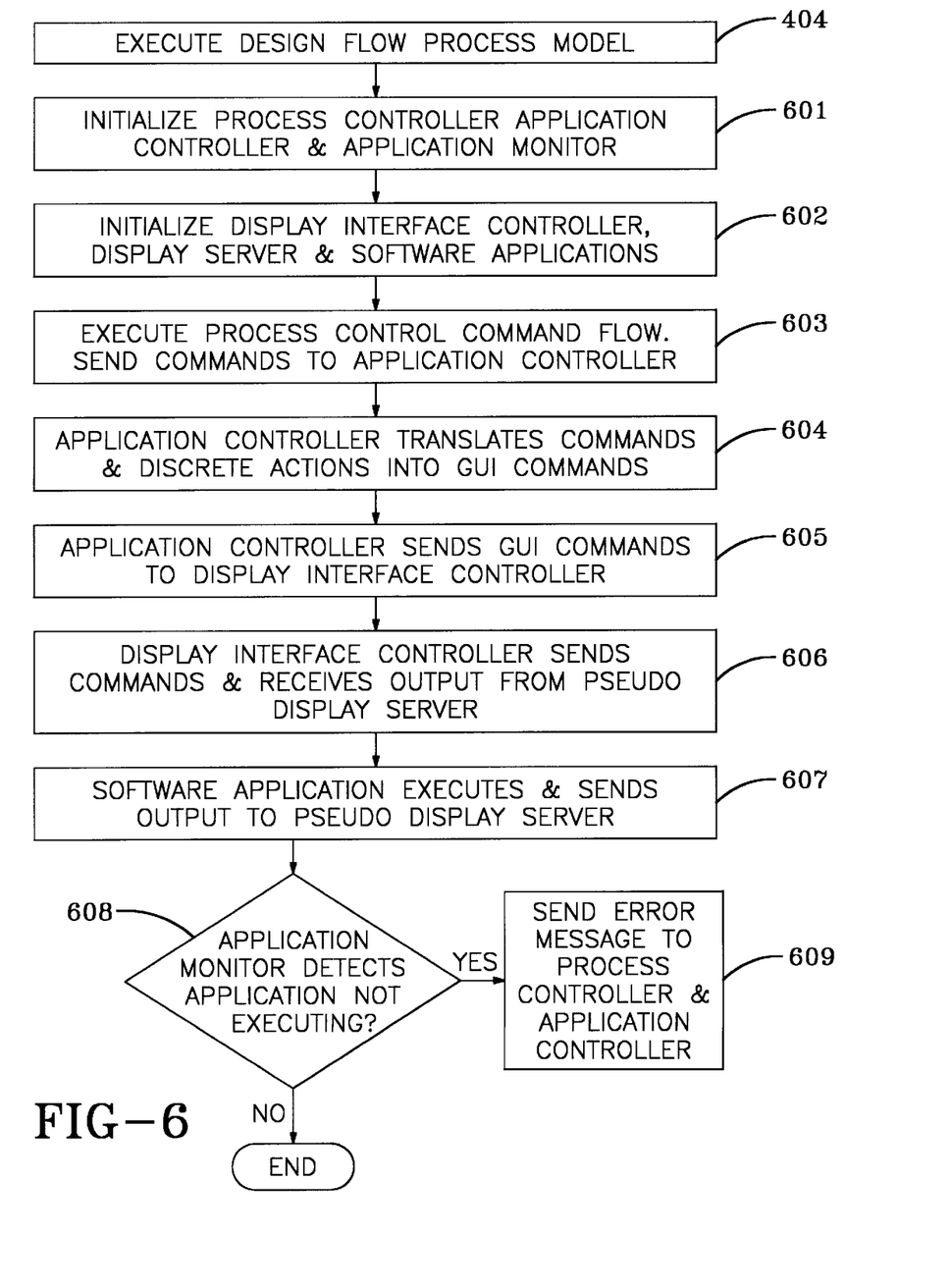
FIG. 6 is a flowchart for executing the design flow process model of FIG. 4 in accordance with the present inventive concept.

Turning now to FIG. 6, the Execute design Flow Process Model step 404 of FIG. 4 is shown in more detail. The process controller, application controller and application monitor are initialized 601. The display interface controller, pseudo display server, application display and application are initialized 602. The process controller executes the command flow by sending commands to the application controller 603. The application controller translates the commands and discrete actions from its map into graphical user interface commands 604. The application controller sends graphical user interface commands to the display interface controller 605. The display interface controller sends commands to and receives output from the pseudo display server 606. The pseudo display server interfaces with the software application which executes 607. As this is occurring, the application monitor monitors the status of the application and if its detects that the application is not executing 608, it sends an error message to the process controller and the application controller 609.

Figure 7:
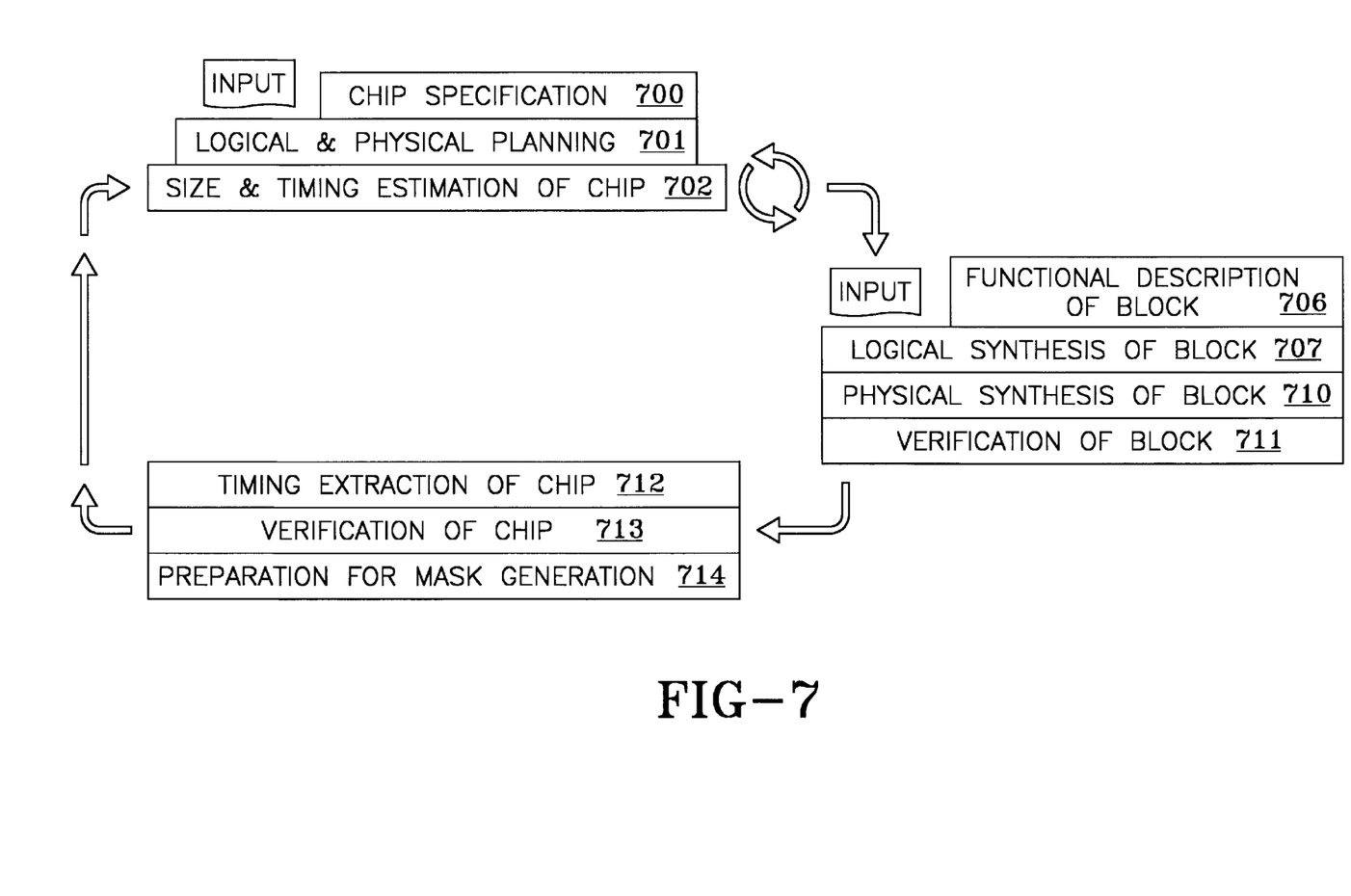
FIG. 7 is an exemplary flow model of the process automation software system for controlling one section of the design process of an electronic circuit in accordance with the present inventive concept.

FIG. 7 shows an exemplary flow model of the process automation software system for controlling one section of the design process. Creating a functional specification for a chip usually begins with the customer and supplier creating the chip specification 700 by determining the functionality needed, size and cost constraints. The next step is determining the chip's logical and physical implementation 701. Size and timing estimations are done 702. The design task is rationally divided, a design hierarchy is created, and the team begins working on the more detailed implementation in individual sections. To translate large amounts of the desired function into the discrete logical elements efficiently, the functional description is described in a programming language at the register transfer level 706, which can be process independent, and is then synthesized into its process specific logical components or block 707.

Figure 8:
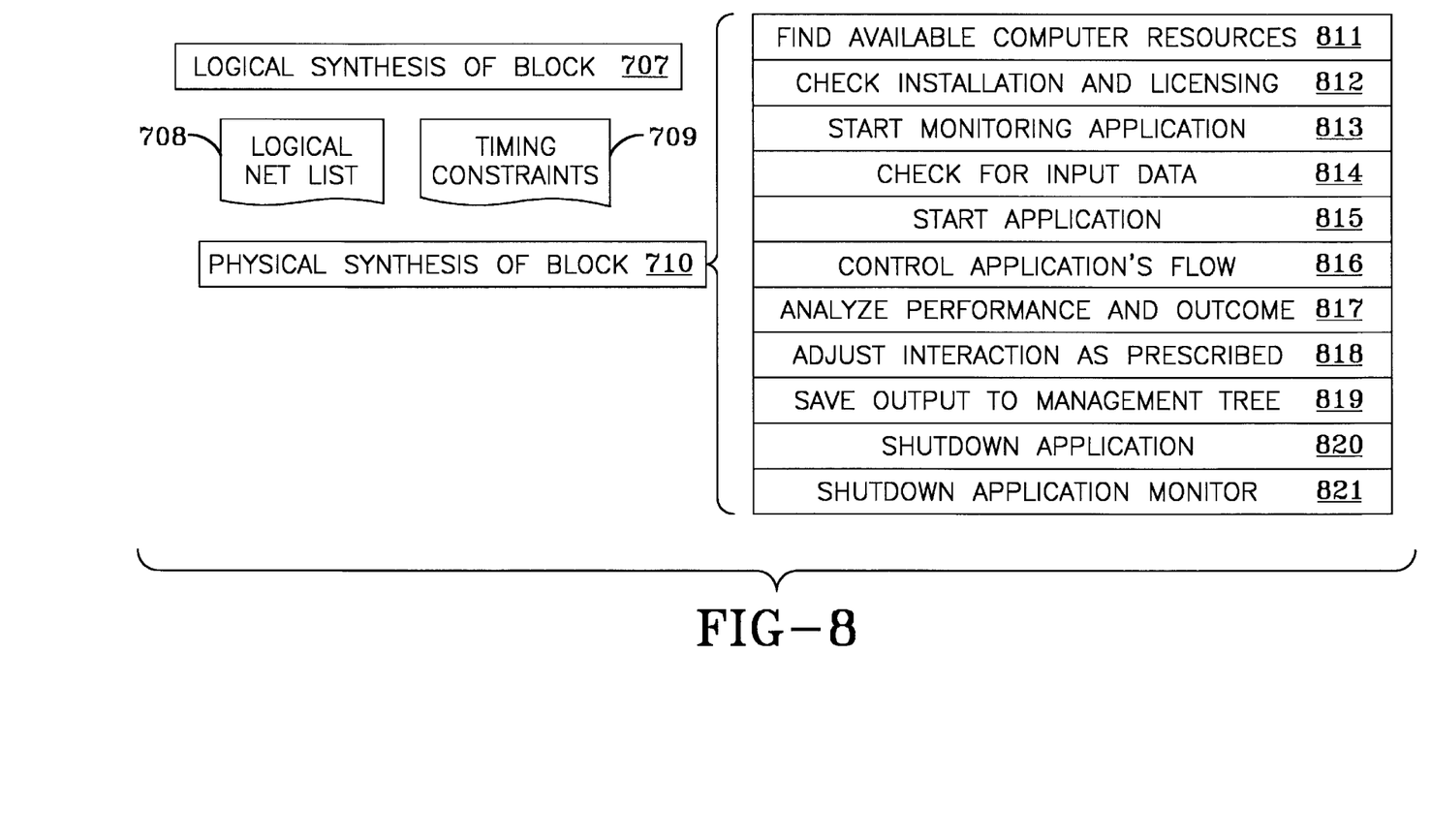
FIG. 8 depicts the physical synthesis model flow of FIG. 7 in greater detail in accordance with the present inventive concept.

Turning now to FIG. 8, the primary output from the logical synthesis software is a schematic or net list 708 which describes all of the logical components and how they are connected. The net list file along with timing constraints 709 is used to physically synthesize the design. This is done by a physical synthesis software application, often referred to as "Place and Route" software, where the physical elements referenced by the logical elements are positioned, placed, and the devices connected.

In FIG. 8, the physical synthesis model flow (Step 710 of FIG. 7), is shown in greater detail. In the physical synthesis as shown in FIG. 8, the following operations are performed by the process automation software program. Available computer resources are located 811 to run the Physical Synthesis software application program. The software application program is chosen from a set of vendor programs that will physically synthesize the circuit. The computer resources selected may be the same computer on which the process automation software program is executing, or a computer specified on a network, or a computer found available on the network by checking a set of criteria such as CPU type, speed, or current load. A check is made to determine if the Physical Synthesis software application program is installed and licensed on the computer selected 812. The application monitor is started on the host machine 813 and reports the execution status of the design process to the process controller shown in FIG. 2 as 202. Any input data needed for the Physical Synthesis application program is retrieved 814. The Physical Synthesis application program is initiated 815. The process controller sends commands through the application controller and the display interface to the pseudo display server for the application and finally to the Physical Synthesis application program, thereby controlling the application's execution 816. The application's performance and output is monitored and analyzed 817 so that appropriate action can be taken by the process controller to adjust actions as needed 818. For example, if the physical synthesis software application program failed to connect all of the devices in the circuit, corrective action would be taken. But if, more than half of the devices were not connected, an error message would be sent to the operator. If the process completes without error, the output is saved 819 and the application 820 and monitor are shutdown 821.

Figure 9:
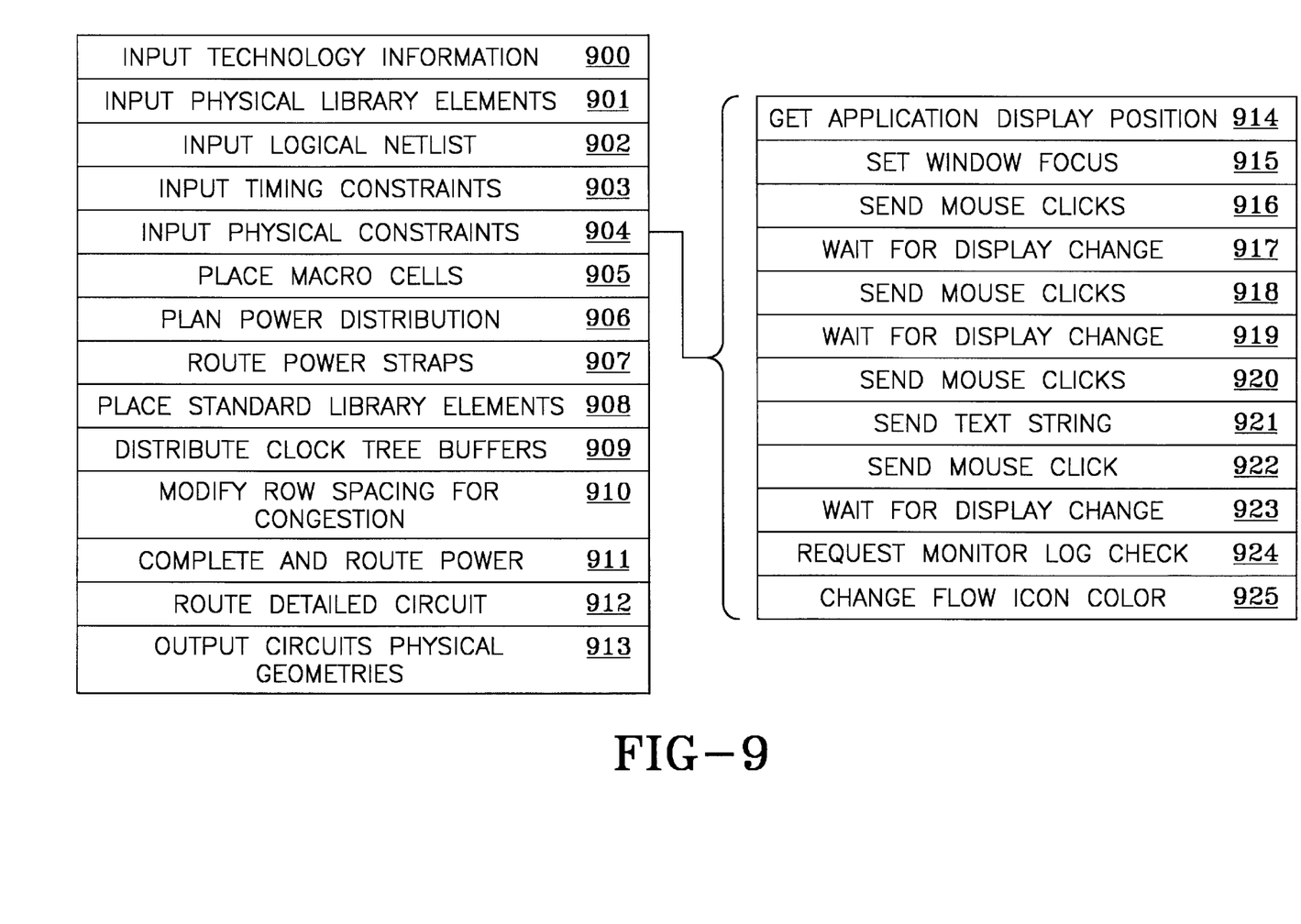
FIG. 9 depicts the control application execution of FIG. 8 in greater detail in accordance with the present inventive concept.

Turning now to FIG. 9, the control application execution step 816 of FIG. 8 is shown in greater detail. Expanding the control application's execution 816, the following actions are executed to simulate user control and automate the application. Technology information is read in to the application 900. This file contains the rules required to manufacture the part in a given facility such as the allowed widths and spacing for example. Then the physical elements that the circuit is comprised of, macro blocks and functional primitives such as nand, nor, xor functions are input 901. The logical net list describing which device to use and how they are connected is input 902. The connections between the devices may have specific timing constraints that needed to be input 903. These will be translated into physical routing length in the given technology and hence influence the placement of the devices. The physical constraints are input 904 such as information from the prior full chip specification such as the locations of the connections at the boundaries, size and shape of this section of the design.

The physical constraint step 904 is now shown in further detail. Since the application believes it is interacting with an operator via a graphical user interface, appropriate display commands, such as mouse clicks and function keys, must be sent to the application. The application's position 914 must be ascertained for an offset to be applied to the display commands to be sent. The focus for the window is set so that the intended application receives the display commands 915. Then the display command, such as a mouse click may be sent 916. The applications display is updated 917 in response to many user input display commands or events. If a display update is expected, the display update is monitored for in the pseudo display interface (205 in FIG. 2) by the application controller (204 in FIG. 2). The change in display indicates the application is responding and additional mouse clicks are sent 920 and the process is repeated 922 and 923. For example, in simulating a user navigating through a pull down menu there may be several click and monitor combinations needed 916–923. If textual information is needed, text strings are sent 921 along with mouse clicks 922. Any application information written to a log file is checked by the application monitor and the information is relayed to the main process controller 924. The program status is displayed to the user. On the user's display, the color of the design flow icon is changed to indicate the status 925.

Macro cells comprising the nonstandard elements such as RAM and ROM are placed into the prescribed area 905. The distribution of power to all of the components is planned out and adjustments made to the area used for device placement 906. Further modification to that area are made as portions of the power distribution scheme are routed, physically connected 907. With this space reserved the standard devices called for in the net list may be placed in the design 908. Next buffers to insure clock performance can be inserted relative to the device locations 909. The congestion is now analyzed to see if further modifications need to be made to the placement to enable all of the connections to be made among the devices 910. If needed, the allowed area for placement is adjusted and the process back to macro placement 905 is repeated depending on the extent of the changes. After achieving a plausible placement, the power routing is completed 911 and the detailed route performed 912. If all criteria have been met, the physical geometry created by this section of the flow model process is stored in the main design's data management structure 913. This section of the design process is also graphically represented by the process automation software program to indicate the status to the user through the design flow model.

Turning back to FIG. 7, the physical synthesis of the block 710 is now completed. The block's correlation, logical to physical and its adherence to the rules of the fabrication technology is verified 711. The physical geometry is passed to another software application for timing analysis 712. Ideally all of the steps described repeat or iterate, until all conditions are met. The final phase of the process is a full verification of the design 713 by another software application and the design is then prepared for mask generation 714. Each step in the process as shown in FIG. 7 is shown graphically at a high level on the user's display. As each step executes or if the user selects a step, the more detailed process as shown in FIGS. 8 and 9 is displayed to the user.

What is claimed is:

1. A computer-implemented method for automating design and manufacture of a product, the method comprising the steps of:
   a. providing an automation software program executing on a computer processor, programmed with a command flow for automating design and manufacture of a product;
   b. the automation software program, according to the command flows initiating and monitoring the execution of a plurality of design software application programs and manufacturing software application programs, each design software application program and each manufacturing software application program having a graphical user interface; and
   c. the automation software program initiating and monitoring the execution of the design software application programs and manufacturing software application programs by communicating with each design software application program and each manufacturing software application program through the graphical user interface of each design software application program and each manufacturing software application program.

2. The method according to claim 1, further comprising the step of executing the design software application programs and manufacturing software applications on the computer processor.

3. The method according to claim 1, further comprising the step of executing the design software application programs and manufacturing software applications on a plurality of computer processors.

4. The method, according to claim 1, further comprising the step of initiating, executing, and monitoring the design software application programs and the manufacturing software application programs in a preprogrammed sequence.

5. The method according to claim 1, further comprising the steps of:
   a. providing a graphical user interface to the automation software program; and
   b. providing a visual representation to the user of the command flow used by the automation software program for automating design and manufacture of the product, through the graphical user interface of the automation software program.

6. The method according to claim 5, further comprising the step of allowing the user to selectively change the command flow used by the automation software program for automating design and manufacture of the product by:
   a. inserting user commands;
   b. inserting input data
   c. changing the order of initiation of the software application programs
   d. deleting software application programs; and
   e. adding software application programs.

7. The method according to claim 5, further comprising the steps of:
   a. providing feedback to the user of the status of the operation of the process command flow used by the automation software program for automating design and manufacture of the product and the status of each design software application program and each manufacturing software application program while it is being initiated and while it is executing; and
   b. providing feedback to the user of the output data and status after each design software application program and each manufacturing software application program has completed running.

8. The method according to claim 7 further comprising the step of displaying the status and output data to the user on the process command flow used by the automation software program for automating design and manufacture of the product, which is displayed on the graphical user interface.

9. The method according to claim 8, wherein the automation software program automates design and manufacture of an electronic circuit.

10. The method according to claim 5 wherein the visual representation of the process command flow used by the automation software program for automating design and manufacture of the product is a flowchart representing the command flow displayed on the graphical user interface.

11. The method according to claim 5, wherein the automation software program automates design and manufacture of an electronic circuit.

12. The method according to claim 1, wherein the automation software program automates design and manufacture of an electronic circuit.

13. A computer-implemented method for automating design and manufacture of a product, the method comprising the steps of:
   a. using design software application programs and manufacture software application programs, each of the software application programs having a graphical user interface;
   b. building an automation software program comprising:
      i. a design flow process model, the model is programmed with a series of command steps for automating design and manufacture of the product, the steps including the execution order of the software application programs;
      ii. a display interface controller that simulates the graphical user interface of each design software application program and each manufacture software application program and sends graphical user interface commands to a display server;
      iii. process controller which executes the design flow process model, controls the order of the command steps and communicates the command steps to an application controller, the application controller tailored for each design software application program and each manufacture software application program;
      iv. the application controller translates process control commands into graphical user interface commands and sends the graphical user interface commands to the display interface controller for communication to the display server; and v. an application monitor that monitors the status of each design software application program and each manufacture software application program being executed and communicates the status of each design software application program and each manufacture software application software program to the application controller and to the process controller.

14. The method according to claim 13, further comprising the steps of:
   a. running the automation software program by executing the design flow process model through the process controller;
   b. translating the command steps into graphical user interface commands by the application controller, which sends the commands to the display interface controller;
   c. sending the graphical user interface commands from the display interface controller to a display server;
   d. initiating and executing the design software application programs and the manufacture software application programs by means of the graphical user interface commands;
   e. receiving graphical user interface commands from the display server at the display interface controller; and
   f. monitoring the status of the design software application programs and the manufacture software application programs being executed by the application monitor and communicating the status of each design software application program and each manufacture software application program to the application controller and to the process controller.

15. A method according to claim 14, further comprising the steps of:
   a. providing a graphical user interface to the automation software program whereby the user can selectively change the automation software program by:
      i. inserting user commands into the design flow process model;
      ii. inserting input data into the design flow process model;
      iii. changing the order of the initiation of the software application programs within the design flow process model;
      iv. deleting software application programs from the design flow process model; and
   b. providing feedback to a user concerning status and progress of the automation software program and the status of the software application programs while each program is being initiated, executed and has completed, the feedback being displayed on the automation software program's graphical user interface.

16. A method according to claim 15, further comprising the steps of:
   a. representing the design flow process model, with its series of command steps, to the user through the graphical user interface as a flow diagram comprising selectable symbols that represent the software application programs, the command steps, input data, and output data; and
   b. building a new process automation software program by allowing the user to selectively change the flow diagram by deleting, reordering or manipulating the selectable symbols via the automation software program's graphical user interface.

17. A method according to claim 16, wherein the status and progress of the automation software program and the status of the software application programs is displayed to the user via the flow diagram of the flow process model.

18. A method according to claim 17, further comprising the step of indicating the status and progress of the automation software program and the status of the software application programs by means of colors displayed on corresponding command steps of the flow diagram.

19. The method according to claim 17, wherein the automation software program automates design and manufacture of an electronic circuit.

20. A method according to claim 16, further comprising the step of building a new process automation software program by allowing the user to selectively change the flow diagram by adding software application programs from a library of stored programs via the automation software program's graphical user interface.

21. The method according to claim 20, wherein the automation software program automates design and manufacture of an electronic circuit.

22. A method according to claim 16, further comprising the step of building a new process automation software program by allowing the user to selectively enter design and manufacture problem parameter data into the process automation software program via the automation software program's graphical user interface.

23. The method according to claim 22, wherein the automation software program automates design and manufacture of an electronic circuit.

24. A method according to claim 14, further comprising the step of running the process automation program after initiation without requiring action by the user.

25. A method according to claim 14, further comprising in the step of running the process automation program, allowing the user to stop the design flow process, change the order of the process and enter input data to be used in the design flow process.

26. The method according to claim 13, wherein the automation software program automates design and manufacture of an electronic circuit.

27. A system for automating design and manufacture of an electronic circuit, comprising a specially programmed computer having:
   a. a memory means for storing a plurality of
      i. design software application programs and manufacture software application programs, each of the software application programs having a graphical user interface;
      ii. design flow process models;
      iii. design and manufacture input data to be input to the software application programs;
      iv. design and manufacture output data to be output from the software application programs;
   b. processor means for
      i. building an automation software program that automates design and manufacture of the electronic circuit, comprising:
         1) the design process flow model, the model is programmed with a series of command steps for automating design and manufacture of the electronic circuit, the steps including the execution order of the software application programs;
         2) a display interface controller that simulates the graphical user interface of each design software application program and each manufacture software application program and sends graphical user interface commands to a display server;
         3) a process controller which executes the design flow process model, controls the order of the command steps and communicates the command steps to an application controller, the application controller tailored for each design software application program and each manufacture software application program;

4) the application controller translates process control commands into graphical user interface commands and sends the graphical user interface commands to the display interface controller for communication to the display server; and 5) an application monitor that monitors the status of each design software application program and each manufacture software application program being executed and communicates the status of each design software application program and each manufacture software application program to the application controller and to the process controller;

ii. executing the automation software program by executing the design flow process model, which in turn executes the software application programs by initiating and communicating with each design software application program and each manufacture software application program through its graphical user interface; and c. the automation software program having a graphical user interface for displaying to the user the status and progress of the execution of the automation software program and the status of the software application programs while each program is being initiated, is executing and has completed.

28. A system, according to claim 27, further comprising in the graphical user interface means:

a. representing the design flow process model as a flow diagram displayed on the graphical user interface comprising selectable symbols that represent the software application programs, the command steps, input data, and output data; and b. allowing the user to selectively change the flow diagram by adding, deleting, reordering and manipulating the selectable symbols via the graphical user interface.

29. The method according to claim 27, wherein:

a. the design software application programs and manufacture software application programs are for design and manufacture of electronic circuits; and b. the design and manufacture input and output data is electronic circuit data.

* * * * *